Nov. 12, 1968  J. C. CUMMING  3,410,610
PARKING AND EMERGENCY BRAKE SYSTEM FOR VEHICLE
Filed July 8, 1966

INVENTOR
James C. Cumming

BY
Strauch, Nolan, Neale, Nies & Bronaugh
ATTORNEYS

Nov. 12, 1968 J. C. CUMMING 3,410,610
PARKING AND EMERGENCY BRAKE SYSTEM FOR VEHICLE
Filed July 8, 1966 5 Sheets-Sheet 2
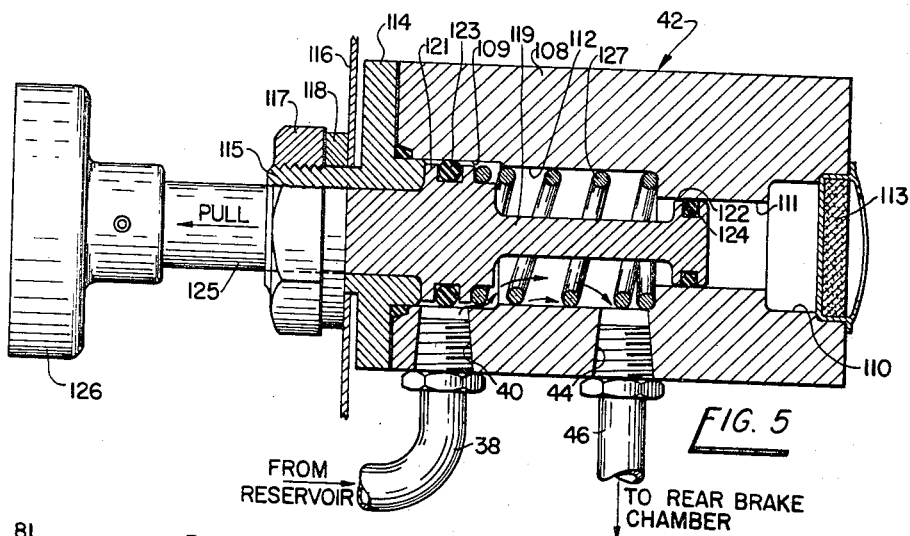
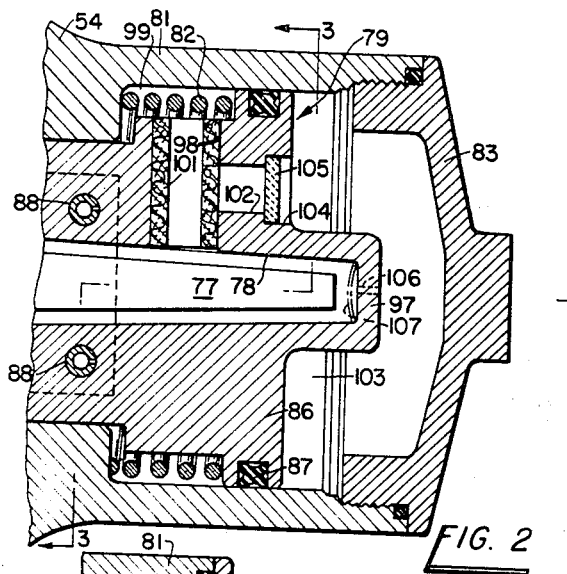
INVENTOR
James C. Cumming
BY
Strauch, Nolan, Neale, Nies & Bronaugh
ATTORNEYS Nov. 12, 1968  J. C. CUMMING  3,410,610
PARKING AND EMERGENCY BRAKE SYSTEM FOR VEHICLE
Filed July 8, 1966                                        5 Sheets-Sheet 3

SERVICE BRAKE APPLICATION

INVENTOR
James C. Cumming

BY
Strauch, Nolan, Neale, Nies & Bronaugh
ATTORNEYS

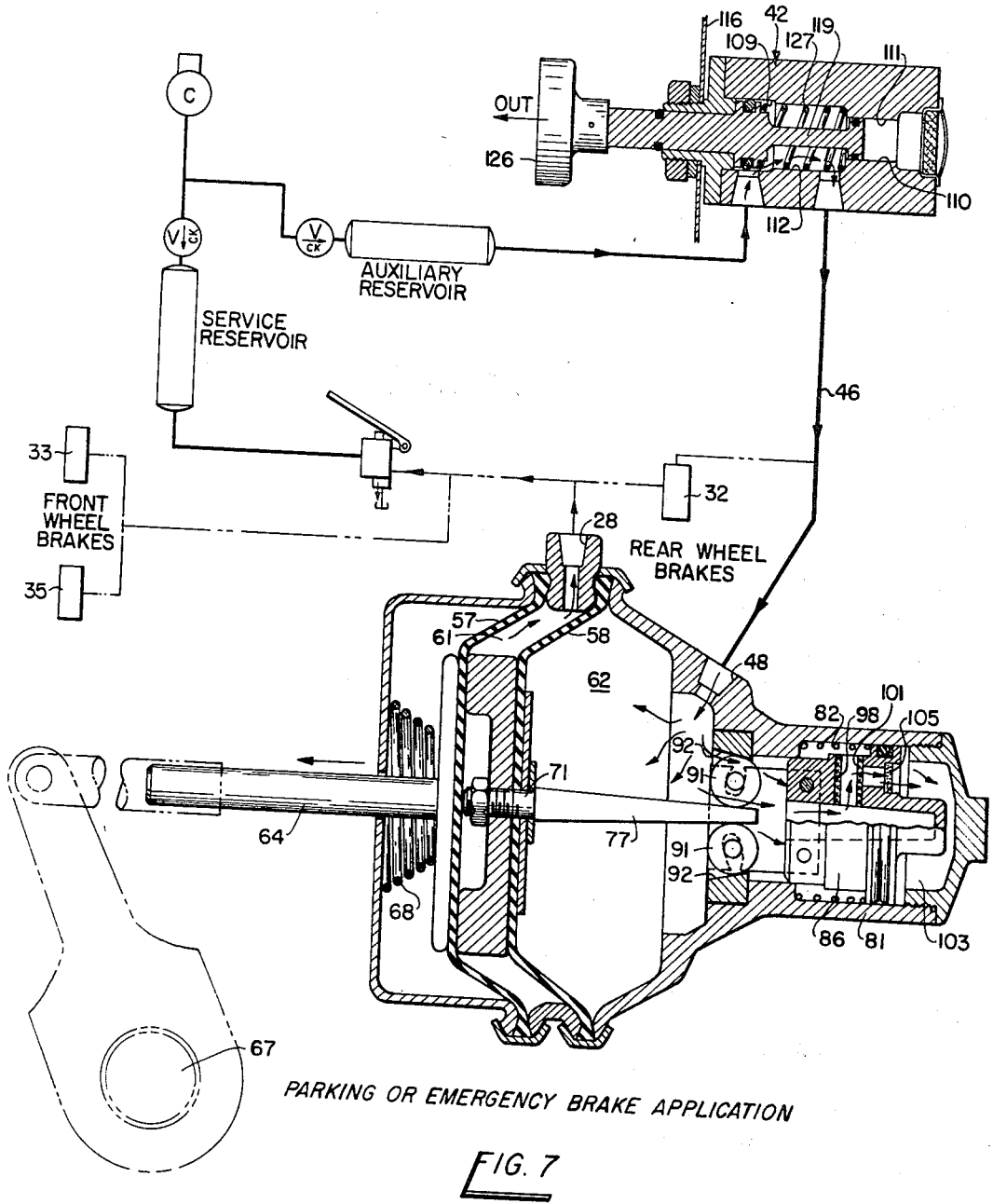

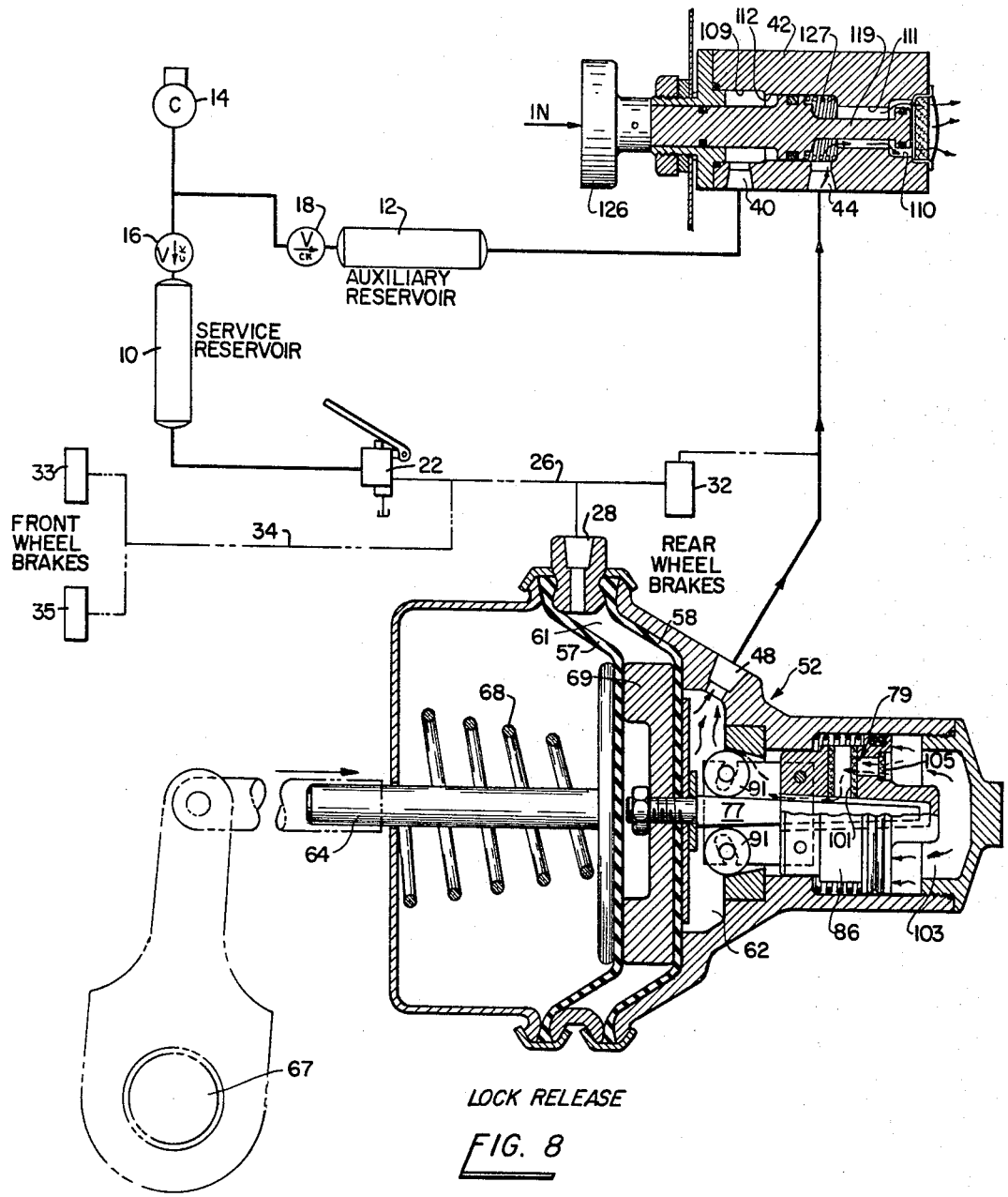

United States Patent Office 3,410,610
Patented Nov. 12, 1968

3,410,610
PARKING AND EMERGENCY BRAKE
SYSTEM FOR VEHICLE
James C. Cumming, Pleasant Ridge, Mich., assignor, by mesne assignments, to Rockwell-Standard Company, Pittsburgh, Pa., a corporation of Delaware
Filed July 8, 1966, Ser. No. 563,806
15 Claims. (Cl. 303—9)

ABSTRACT OF THE DISCLOSURE

An air brake system for an automotive vehicle comprises two independent systems, a service system for operating front and rear wheel brakes and a parking and emergency system for operating the rear wheel brakes, there being double diaphragm brake actuators at the rear wheels each having a service chamber between the diaphragms and an auxiliary chamber between the auxiliary diaphragm and the housing, the service brake system having a manual control for connecting the service chambers to a source of air pressure, and the parking and emergency system containing a manual control valve for selectively connecting the auxiliary chamber to an independent source of air pressure to displace the auxiliary diaphragms in brake applying direction, a unidirectional mechanical locking device for each auxiliary diaphragm permitting movement of the auxiliary diaphragm in the brake applying direction but preventing return movement and being connected to a spring biased piston directly exposed on one side to the pressure in the auxiliary chamber and having a bleed passage therethrough to a release chamber on its other side, the locking device being released by moving said control valve to a third position wherein the auxiliary chamber is vented quickly and the temporary higher pressure in the release chamber displaces the piston and locking device to release the auxiliary diaphragm for return movement under the usual brake return springs.

---

This invention relates to vehicle braking systems and more in particular to a combined service and auxiliary parking and emergency braking system of the type disclosed in my copending United States application Ser. No. 465,893 filed June 22, 1965 for Vehicle Brake System.

This invention has for a general object the reduction of the number and total length of fluid pressure lines in such systems, thus reducing the cost, maintenance and assembly work for any particular installation, as well as greatly facilitating the installation since space in the vehicle undercarriage need only be provided for two fluid lines for each brake instead of three as earlier required. Apart from the foregoing other objects of the invention relate to improved safety features incorporated in the system and a simplified efficient release mechanism.

In brake systems of this type with which the present invention is primarily concerned, a double diaphragm brake actuator unit is provided at each rear wheel brake, the unit containing in combination service and parking or emergency brake motors arranged in tandem and equipped with a mechanical lock mechanism that is automatically effective upon parking or emergency operation to lock the service brakes in applied condition. The unit also has a fluid pressure responsive device to selectively release the lock after parking or emergency operation.

The improvements provided by the invention include the incorporation of a novel valve in the release device which in cooperation with position control by a manual valve allows automatic release of the lock mechanism. Another improvement resides in the novel construction of the manual valve that automatically moves the valve to a brake applying and lock position when the system fluid pressure decreases below a predetermined value. A mechanical release is provided to manually release the lock when there is insufficient fluid pressure in the system to actuate the release device, to enable the vehicle to be moved.

Accordingly, this invention provides as its main object a novel two-line service and parking and emergency vehicle brake system with mechanical locking means effective in parking and emergency conditions and novel fluid pressure responsive lock release means, in combination with a manual actuating valve embodying novel safety features which automatically apply the brakes or prevent the release of the lock when the system pressure falls below a predetermined value.

Other novel objects and improved features will become readily apparent from the following detailed description in connection with the appended drawings in which:

FIGURE 2 is an enlarged fragmentary view in section showing internal detail at the release end of the actuator unit;

FIGURE 3 is a section through FIGURE 2 along line 3—3 showing further internal detail;

FIGURE 4 is a section similar to FIGURE 2 showing a manual release arrangement;

FIGURE 5 is an enlarged section showing the manual control valve of FIGURE 1 with the plunger in parking or emergency position;

FIGURE 7 is a mainly diagrammatic view of the system like FIGURES 1 and 6, showing emergency or parking brake application; and FIGURE 8 is a mainly diagrammatic view of the system like FIGURES 1, 6 and 7, showing release of the parking or emergency position and release of the mechanical lock.

Figure 1:
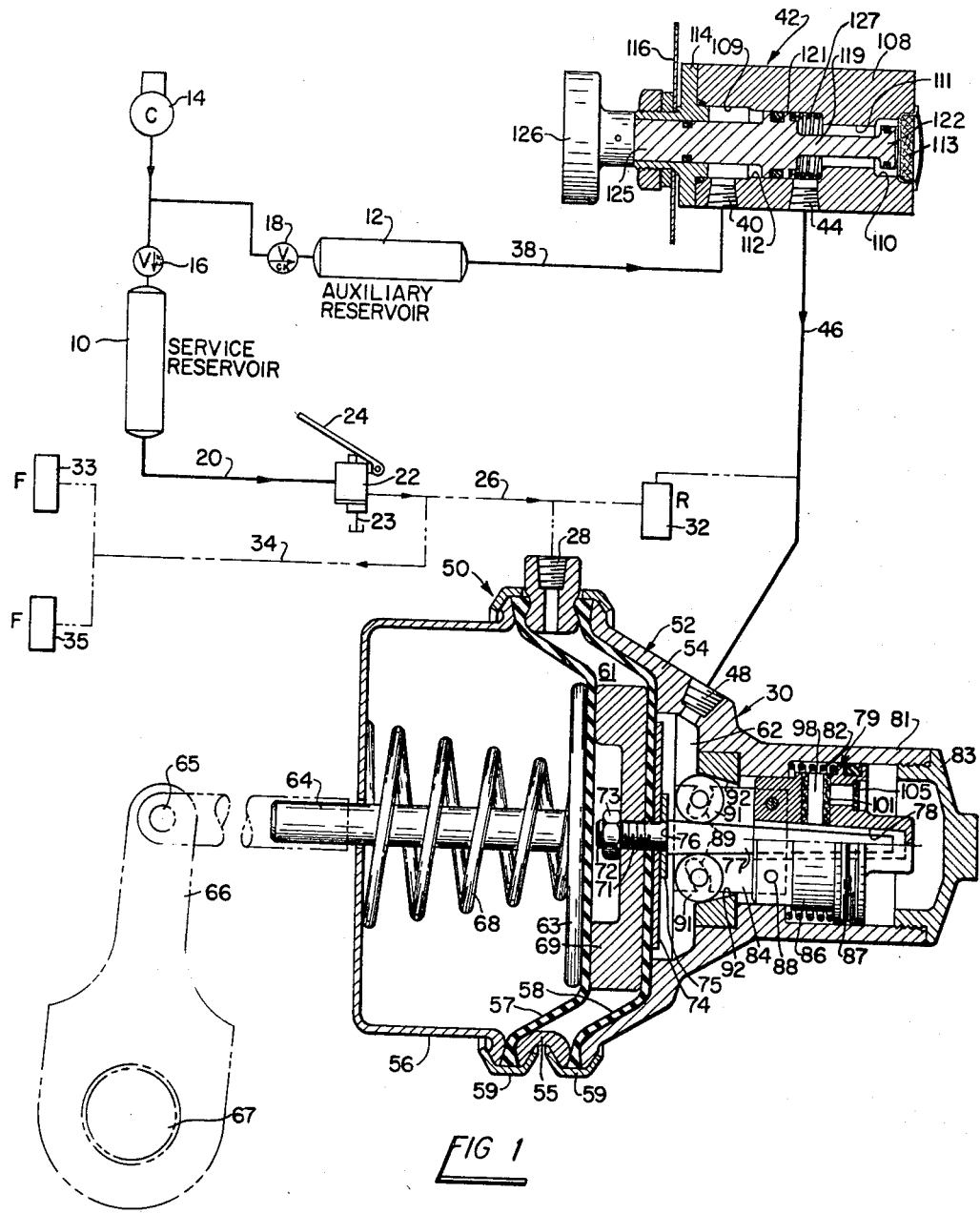
FIGURE 1 is a mainly diagrammatic view showing a vehicle braking system according to a preferred embodiment of the invention and showing the main manual control valve and an actuator unit enlarged in section.

FIGURE 1 shows a vehicle mounted compressed air braking system comprising two independent fluid lines supplying air under pressure from an air compressor 14 through unidirectional check valves 16 and 18 to a service reservoir 10 and an auxiliary reservoir 12. Service line 20 from service reservoir 10 is connected to the inlet side of a conventional treadle valve 22 having an exhaust to atmosphere at 23 and operated by a foot pedal 24. The outlet of valve 22 is connected by conduit 26 to the inlet 28 of an actuator unit 30 in the form of a compound fluid pressure motor assembly which is identical for both rear wheel brakes.

FIGURE 1 diagrammatically shows connection of line 26 to the other rear wheel brake at 32, and a branch line 34 connecting line 26 to front wheel brake actuators 33 and 35. Thus, upon depression of pedal 24, compressed air from service reservoir 10 is supplied to the actuators for the rear wheel brakes and the actuators for the front wheel brakes. This is normal service brake operation.

The outlet conduit 38 of auxiliary reservoir 12 is connected to the inlet 40 of a manual control valve 42 which is attached to the vehicle dashboard within convenient reach of the driver. Outlet 44 of valve 42 is connected by conduit 46 to the inlets 48 of each rear wheel brake actuator 30.

Each actuator 30 comprises a service motor 50 and an auxiliary motor 52 disposed in tandem within a common housing structure.

Actuator 30 comprises an essentially three part housing consisting of a relatively rigid cup-shaped housing end member 54, an annular intermediate housing member 55 and a relatively stiff, preferably sheet metal, cup-shaped end member 56. Internally, the actuator contains a flexible service diaphragm 57 and a flexible auxiliary diaphragm 58. The outer periphery of diaphragm 57 is tightly clamped between the open end of housing end member 56 and one side of intermediate member 55, and the outer periphery of diaphragm 58 is tightly clamped between the open end of the housing end member 54 and the other side of intermediate member 55, as by sheet metal ring clamps indicated at 59.

The service motor chamber 61 is defined between diaphragms 57 and 58 and housing member 55, service inlet 28 being formed in member 55. The auxiliary motor chamber 62 is defined between diaphragm 58 and housing end member 54, auxiliary inlet 48 being formed in member 54. In the disclosed embodiment as will appear, chamber 62 is used for emergency and parking actuation of the service brakes.

Within the housing one side of service diaphragm 57 is engaged by the enlarged head 63 of a plunger rod 64 that projects freely through a suitable aperture in the housing for pivotal connection at 65 to an arm 66 fixed on a camshaft 67. This camshaft may be mounted and associated with the wheel brake as disclosed in Scheel Patent No. 2,892,662. A spring 68 biases the service diaphragm to the right in FIGURE 1, this being the normal brake disengaged condition of the actuator.

Diaphragms 57 and 58 are maintained spaced sufficiently to define chamber 61 by a spacer element 69 disposed between them. Spacer 69 is fixed to the central part of diaphragm 58. A wedge rod 71 extends through the diaphragm and spacer and has a threaded end 72 terminating within the spacer recess to mount a nut 73. A backing plate 74 is disposed on the other side of the diaphragm engaging a washer 75 seated on an axial shoulder 76 on the wedge rod. When nut 73 is drawn tight, the spacer 69 and diaphragm 58 are tightly secured to wedge rod 71.

The mounting, composition and structure of spacer 69 may be as disclosed in said Ser. No. 465,893 or in the copending application of Williams Ser. No. 545,468 filed Apr. 26, 1966 to which attention is directed for further detail.

Wedge rod 71 carries an integral wedge 77 that projects within the central recess 78 of a piston assembly 79 that is reciprocable within a cylindrical wall section 81 of housing end member 54. Piston assembly 79 is normally biased to the right in FIGURES 1 and 2, as by a compression spring 82 reacting against the housing. A removable threaded cap 83 closes the cylinder end.

Wedge 77 extends between two side plates 84 and 85 (FIGURE 3) into the piston element 86 of assembly 79 which is slidable within cylinder 81 and has an annular seal ring 87 on its periphery.

Plates 84 and 85 are inserted into suitable recesses in piston 86 and retained therein as by self-locking pins 88. Plates 84 and 85 are slotted at 89 to receive and retain a pair of freely rotatable rollers 91, one at each inclined side of wedge 77 which extends therebetween. The outer sides of the rollers 91 engage inclined inner surfaces 92 within housing 54. Surfaces 92 are each inclined at a steeper angle than the adjacent side of the wedge to obtain maximum holding capability as will appear.

In the normal brake disengaged position shown in FIGURE 1, rollers 91 are located in bridging relation across the high points of the wedge surfaces and the associated inclined housing surfaces, establishing substantially frictionless rolling contact with these surfaces against which they are urged by the piston biasing spring 82.

Wedge 77, rollers 91, surfaces 92 and piston 86 combine to form a mechanical lock mechanism to lock the service brakes in applied position during parking or after an emergency brake application. This lock can be selectively released by fluid pressure applied to piston assembly 79 as will appear or, as shown in FIGURE 4, by manual means such as a slidable plunger 94 when insufficient or no fluid pressure is available.

This manual release comprises plunger 94 sealingly slidable in the housing end and having an inner head 95 adapted to abut the rear of the piston 86 when the piston is in its rearmost, that is, locked position. Plunger 94 may be displaced by tapping it with an appropriate tool.

Figure 6:
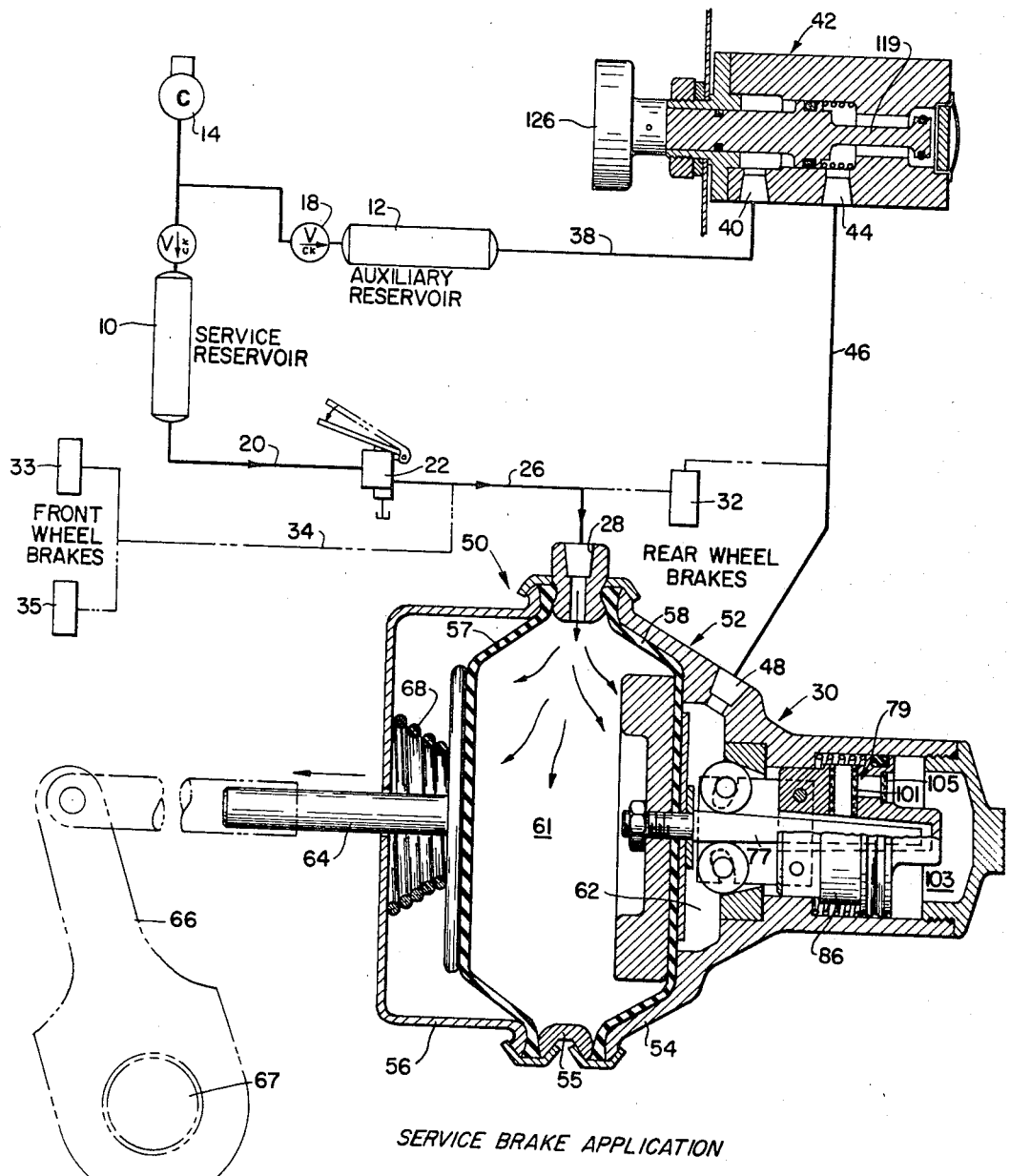
FIGURE 6 is a mainly diagrammatic view of the system similar to FIGURE 1, and showing normal service application of the brake.

When service air pressure enters chamber 61 in FIGURE 1, diaphragm 57 is displaced to the left to rock the camshaft 67 to apply the service brakes. At this time valve 42, details of which will be described more fully later, is in the FIGURE 1 position where it blocks supply of air from conduit 38 and no auxiliary air pressure is introduced into chamber 62, so that diaphragm 58 and piston assembly 79 remain relatively stationary. This service motor operating condition is shown in FIGURE 6.

When valve 42 is operated to connect conduits 38 and 46, as shown in FIGURES 5 and 7, air under pressure enters chamber 62 to displace diaphragm 58, spacer 69 and diaphragm 57 as a unit to the left in FIGURE 1 to rock the camshaft to apply the service brakes. This condition is shown in FIGURE 7. Wedge rod 71 is carried along with diaphragm 58 in this action and, while rollers 91 permit free displacement of wedge 77 to the left with respect to piston 86 and the housing surfaces 92, the rollers become wedged between the wedge and housing surfaces 92, the rollers become wedged between the wedge and housing when wedge rod 71 tends to move to the right, which results in the diaphragm 58 being locked in brake engaged position, and the brakes remain so locked until released either by the automatic arrangement now to be described or the manual release of FIGURE 4. The piston 86 does not move during this operation, and spring 82 exerts the force holding the rollers resiliently in locking condition.

To the foregoing extent, the structure and operation of actuator 30 and the system are essentially as disclosed and claimed in my said co-pending application Ser. No. 465,893 to which attention is directed for necessary detail.

As shown in FIGURES 1, 2 and 3 piston recess 78 is rectangular in cross-section and closed by end wall 97. Piston 86 is of smaller diameter where it is surrounded by spring 82, and this portion of the piston which is disposed axially inwardly of sealing ring 87 is formed with a radial bore 98 that connects the cylinder space 99 with internal piston recess 78. Disposed within bore 98 is an inserted hollow cylindrical dry type air filter 101 of suitable material such as wire gauze or felt for a purpose to appear. Intersecting bore 98 at right angles at a suitable distance radially inward from the piston outer periphery is an axial bore 102 that connects bore 98 with the release chamber 103 of the cylinder at the right of piston 86. Bore 102 is counterbored at 104 at its outer end to receive a slow leak valve member 105 which in this instance may comprise a porous plug of powdered metal, ceramic or other similar material having preferably a fineness of about 20 microns or better. Filter 101 is provided to protect the minute interstices of the porous valve 105 against contaminated air.

Thus, a direct fluid communication exists between the parking or emergency pressure chamber 62 and release chamber 103 between piston 86 and the housing. Thus, chamber 103 can be termed a slow pressure build-up chamber, fluid communication being by way of the internal piston recess 78 through filter 101 and out through the slow leak valve 105. This arrangement is provided to slowly build up release pressure in chamber 103 after a parking or emergency brake application.

In certain instances and where appropriate or more effective, instead of the filter 101 and slow leak valve 105, a suitably small orifice 106 may be provided in piston end wall 97 to provide direct communication between recess 78 and chamber 103. A suitable snap fit shield 107 of filtering media may be provided at the inside of the piston recess to prevent orifice 106 from being plugged up by contaminated air.

Manual control valve

The manual control valve structure is shown in enlarged detail in FIGURE 5. Valve 42 comprises a hollow housing 108 having a through bore formed with coaxial cylindrical sections 109 and 111 spaced by an intermediate cylinder 112. At one end the housing bore is enlarged at 110 and closed by a filter plug 113. At the other end, an annular end plate 114 is rigidly secured to the housing and has a threaded hollow boss 115 extending through a suitable aperture in a stationary part 116 of the vehicle, to which it is attached by nut 117 and washer 118. This mounts valve 42 in the vehicle.

A valve plunger 119 has spaced integral pistons 121 and 122 and it is slidably axially of the housing bore. Seal rings 123 and 124 are provided on the respective pistons. Plunger 119 has a stem 125 projecting slidably through end plate 114 to terminate in a manual knob 126 accessible to the operator. A spring 127 in chamber 112 biases the plunger to the left in FIGURE 5.

FIGURE 1 shows the plunger position in valve 42 during normal service driving conditions. Piston 121 is slidingly sealingly disposed in intermediate cylinder 112 and blocks passage of air through inlet 40, and outlet 44 is connected to atmosphere since piston 122 has been displaced to the larger part of the bore beyond cylinder 109. This vents the auxiliary actuator chambers 62 to atmosphere.

FIGURE 5 shows the plunger position in valve 42 when the plunger is pulled out for parking or emergency operation of the brakes. The larger piston 121 is now displaced into cylinder 109 which is slightly larger in diameter than cylinder 112 and air under pressure is allowed to pass from auxiliary reservoir 12 through the valve cylinders 109 and 112 and outlet 44 and conduit 46 into the parking or emergency brake chambers 62 of the actuators 30. Small piston 122 is slidingly sealingly disposed in cylinder 111 and closes the vent in this position. While the larger piston of the valve plunger is biased outwardly, this is, toward the parking or emergency brake application position of FIGURE 5 by spring 127, the plunger once set in this condition of FIGURE 5 is normally held stationary by the sufficient safe pressure in chamber 112 derived from the auxiliary reservoir 12 acting on piston 121. This arrangement embodies a safety feature as will be later explained.

Normal service brake operation

FIGURE 6 illustrates normal service brake application. When the operator depresses foot pedal 24 treadle valve 22 is opened to allow compressed air from the service reservoir 10 to enter inlet 28 in the service unit 50 and into the service pressure chamber 61 by which the diaphragm 57 is displaced to move push rod 64 to rock the cam on shaft 67 into brake applying position.

The auxiliary parking and emergency motor 52 during this interval remains inactive since knob 126 of manual valve 42 is pushed all the way in to block communication between the auxiliary reservoir 12 and the parking and emergency pressure chamber 62 in motor 52 which is at the time vented to atmosphere through conduit 46 and valve 42.

Upon release of foot pedal 24, valve 22 closes and exhausts line 26 to atmosphere to allow discharge of air from chamber 61 while the usual return springs of the brake assembly return service diaphragm 57 to the FIGURE 1 position.

Parking or emergency operation

With particular reference to FIGURE 7, when the operator desires to park the vehicle, or to apply the service brakes in an emergency, as when the service system air pressure has failed, the operator pulls out knob 126 to the FIGURES 5 and 7 position, connecting the auxiliary reservoir pressure to actuator chamber 62 through the interior of valve 42 and conduit 46.

Air pressure in chamber 62 causes diaphragm 58 to be moved to the left and spacer member 69 is a force transmitting member that acts directly on service diaphragm 57 to thus apply the service brakes. Excess air in service pressure chamber 61 is forced out through inlet 28 and line 26 to atmosphere through vent 23 in treadle valve 22.

The auxiliary air pressure in chamber 62 acts on the adjacent side of piston 86 (as indicated by the arrows) in FIGURE 7 forcing the piston rearwardly assisted by the expansion of spring 82 so that rollers 91 are forced to roll down on the inclined housing surfaces 92 at the same time that wedge 77 is drawn out of piston 86 by the moving diaphragm 58. Wedge 77 however is firmly locked between the rollers and housing should it start to move in the opposite direction, thereby maintaining the mechanism locked in brake applied position even if all air pressure should be gradually lost from the compressor, auxiliary reservoir 12 or line 46.

As indicated by the arrows, some air under auxiliary pressure enters piston recess 78 and communicating bore 98 to slowly pass through porous valve 105 into release chamber 103. This air flow through valve 105 continues until air pressure on both sides of piston 86 is balanced.

During prolonged parking of the vehicle, it may happen that some of the air pressure drains out of holding chamber 62. When that occurs, air pressure from chamber 103 escapes back through porous valve 105 into chamber 78 in an effort to again equalize the pressure on opposite sides of the piston, thus preventing the mechanical lock from being accidentally released.

Lock release operation

With references to FIGURE 8, when the operator desires to release the brake from the locked condition of FIGURE 7 and providing sufficient safe operating pressure is available in the system, he pushes plunger 119 into manual control valve 42 to the FIGURES 1 and 8 position, thereby interrupting communication between auxiliary reservoir 12 and the parking or emergency pressure chamber 62. At this time the smaller plunger piston 122 has been displaced into the larger bore portion 110 thus venting the parking or emergency pressure chamber 62 to atmosphere. The pressure differential between the atmosphere and the compressed air in chamber 62 causes pressure to quickly dissipate from chamber 62 through conduit 46 as shown by the arrows in FIGURE 8. This allows the normally incorporated brake shoe return springs (not shown) and diaphragm return spring 68 to return diaphragms 57, 58 toward their normal inactive position of FIGURE 1 whereby wedge 77 is moved back toward its position within piston 86 as shown in FIGURE 8.

As above explained, compressed air has bled through the piston and accumulated in release chamber 103 during the period of parking or emergency brake application. As chamber 62 quickly reduces to atmospheric pressure a temporary pressure differential exists on opposite sides of piston 86 because the air pressure in chamber 103 cannot bleed back through piston 86 as fast as the air pressure drops in chamber 62. Thus, while the air pressure from chamber 103 is slowly escaping through the piston valve 105, the air pressure in chamber 103 exerts a force on piston 86 (as indicated by the arrows at the right in FIGURE 8) urging and displacing piston 86 to the left against the force of bias spring 82 thus causing rollers 91 to roll forward and up the inclined housing surfaces 92 sufficiently for unlocking the mechanism and permitting wedge 77 to move into the piston. After unlocking has been effected, loss of air under pressure from chamber 103 will continue until pressure balance is established between the atmosphere and the pressure chambers 62 and 103, at which time the parts will assume the positions shown in FIGURE 1.

Thus, instead of requiring a third fluid pressure line to displace piston 86 in the wedge unlocking direction as heretofore required, the invention accumulates air pressure during the period of emergency or parking and then selectively uses the accumulated pressure to release the mechanical lock.

The foregoing release operation can be slowed down or completely interrupted or the lock re-established at any time at the will of the operator if found necessary, by simply holding the push-in movement of the manual valve plunger or pulling it back out again.

*Safety feature*

Manual valve 42 is designed to incorporate a safety feature by means of which service brakes will be automatically applied and locked if the pressure in the auxiliary parking and emergency system falls below a predetermined safe operating pressure.

For this purpose valve plunger 119 is biased by a spring 127 which is compressed between the valve housing and the larger forward piston 121. The force of spring 127 is designed such that it will expand automatically when the pressure in the parking or emergency system falls below the safe operating level, for causing plunger 119 to be moved outwardly to the FIGURE 5 position thereby cutting off the vent of chamber 62 to the atmosphere and opening communication between auxiliary reservoir 12 and the pressure chamber 62 by which the remaining air pressure in reservoir 12 is quickly connected into auxiliary pressure chamber 62 to apply the service brakes and the lock mechanism in the same manner as described for the parking and emergency brake application.

In this situation release cannot be effected by simply pushing plunger 119 back into the valve 42 since the plunger would immediately pop back out under the force of spring 127 when the knob was released, thus providing an effective indicating means for the operator that he has not sufficient operating pressure for the parking or emergency system.

To enable the vehicle to be moved to a place of repair the lock may be released by the operator forcibly holding the plunger 119 in the FIGURE 1 position or by the manual release means illustrated in FIGURE 4. Normal operation of the manual valve 42 can only be re-established after the cause for the pressure drop has been eliminated.

Thus, the present invention provides a safe, simplified two-line service and parking or emergency brake system which requires but little maintenance and a minimum amount of installation space.

The safety feature incorporated in the system assures that the vehicle may be safely parked for any length of time.

The present invention may be embodied in certain other forms without departing from the spirit and essential characteristics thereof, therefore the present embodiments are to be considered in all respects as illustrative only and not restrictive, the scope of the invention being indicated by the appended claims rather than by the foregoing description.

I claim:

1. Vehicle brake actuating means comprising a service fluid pressure system connected for normal operation of said brake, a normally inoperative independent auxiliary fluid pressure system adapted to be connected for auxiliary operation of said brake, control means for said auxiliary system selectively operable for maintaining said auxiliary system inoperable with respect to said brake and for applying auxiliary fluid pressure to actuate said brake, mechanical means effective only when said brake is operated by said auxiliary system for locking said brake in applied condition and comprising a movable locking member, and release means operably connected to said locking member and comprising fluid pressure responsive means automatically energized when said auxiliary fluid pressure is connected to apply said brake and automatically operable to positively shift said locking member to release said locking means when said auxiliary system is rendered inoperable by said control means.

2. In the vehicle brake actuating means defined in claim 1, an actuator containing an auxiliary fluid pressure chamber having a movable fluid pressure responsive member to which said auxiliary fluid pressure is applied and to which said locking means is operatively connected, and said release means comprising a fluid pressure responsive element in said actuator operatively connected to said locking means and having one side exposed to the pressure in said auxiliary chamber and the other side exposed to the pressure in a release chamber in said housing, there being a restricted passage between said chambers whereby the pressure in said release chamber may gradually rise to that of the auxiliary chamber when the auxiliary fluid pressure is applied to apply the brake and the stored pressure in said release chamber is effective to displace said fluid pressure responsive element to release the locking means when said auxiliary fluid pressure is quickly removed from said auxiliary chamber by operation of said control means.

3. Vehicle brake actuating means comprising a service fluid pressure system adapted to be connected for auxil- said brake, a normally inoperative independent auxiliary fluid pressure system adapted to be connected for auxiliary operation of said brake, control means for said auxiliary system selectively operable for maintaining said auxiliary system inoperable with respect to said brake and for applying auxiliary fluid pressure to actuate said brake, means effective only when said brake is operated by said auxiliary system for locking said brake in applied condition, and release means for releasing said locking means including fluid pressure responsive means automatically energized when said auxiliary fluid pressure is connected to apply said brake, said release means comprising a release chamber within which auxiliary fluid pressure is accumulated and means defining a fluid pressure bleed passage between said auxiliary system and said release chamber, and said fluid pressure responsive means being a movable fluid pressure responsive element in said locking means subject to the fluid pressure in said release chamber, said element being a piston and said passage extending through said piston.

4. Vehicle brake actuating means comprising a service fluid pressure system connected for normal operation of said brake, a normally inoperative independent auxiliary fluid pressure system adapted to be connected for auxiliary operation of said brake, control means for said auxiliary system selectively operable for maintaining said auxiliary system inoperable with respect to said brake and for applying auxiliary fluid pressure to actuate said brake, means effective only when said brake is operated by said auxiliary system for locking said brake in applied condition, and release means for releasing said locking means including fluid pressure responsive means automatically energized when said auxiliary fluid pressure is connected to apply said brake, said control means being valve means in said auxiliary system, and means in said valve means for automatically operating said valve means to apply auxiliary fluid pressure to operate said brake when the auxiliary system pressure falls below a predetermined value.

5. An actuator assembly for a vehicle brake comprising a housing, two spaced fluid pressure responsive members within said housing providing separate fluid pressure chambers within said housing, one of said chambers being a service chamber adapted to be connected to a service fluid pressure line, and the other chamber being an auxiliary chamber adapted to be connected to an independent auxiliary fluid pressure line, a brake mechanism actuator device operably connected to one of said members, means for introducing fluid under pressure into said service chamber to displace said one member in brake applying direction, means for introducing fluid under pressure into said auxiliary chamber for moving the other member in said brake applying direction, means providing a motion transmitting connection between said members so that both members move together in the brake applying direction only when said auxiliary chamber is pressurized, means for locking said other member against return movement in different positions of displacement in said brake applying direction, and means energized by fluid pressure derived from said auxiliary pressure line for positively automatically releasing said locking means when the pressure in said auxiliary chamber is reduced.

6. In the actuator assembly defined in claim 5, said last means comprising a movable pressure responsive element operably connected to said locking means, and a release chamber in said housing at one side of said element having a pressure bleed passage connected to said auxiliary chamber.

7. In the actuator assembly defined in claim 6, said element being a piston reciprocable in said housing with the other side exposed to the pressure of said auxiliary chamber.

8. An actuator assembly for a vehicle brake comprising a housing, two spaced fluid pressure responsive members within said housing providing separate fluid pressure chambers within said housing, one of said chambers being a service chamber adapted to be connected to a service fluid pressure line, and the other chamber being an auxiliary chamber adapted to be connected to an independent auxiliary fluid pressure line, a brake mechanism actuator device operably connected to one of said members, means for introducing fluid under pressure into said service chamber to displace said one member in brake applying direction, means for introducing fluid under pressure into said auxiliary chamber for moving the other member in said brake applying direction, means providing a motion transmitting connection between said members so that both members move together in the brake applying direction when said auxiliary chamber is pressurized, means for locking said other member against return movement in different positions of displacement in said brake applying direction, and means energized by fluid pressure derived from said auxiliary pressure line for releasing said locking means comprising a piston reciprocable in said housing and operably connected to said locking means, said piston having one side exposed to the pressure of said auxiliary chamber, and a release chamber in said housing at the other side of said piston having a pressure bleed passage connection through said piston to said auxiliary chamber, said piston being displaced in a direction to release said locking means when the pressure in said auxiliary chamber is so reduced relative to release chamber pressure that a differential pressure exists across the piston.

9. In the actuator assembly defined in claim 8, said passage containing a pressure restricting valve.

10. In a fluid pressure responsive vehicle brake system having a service reservoir containing fluid under pressure and an auxiliary reservoir containing fluid under pressure, an actuator assembly comprising a housing, two spaced flexible diaphragms disposed in tandem within said housing and defining a service fluid pressure chamber between said diaphragms and an auxiliary fluid pressure chamber between one of said diaphragms and the housing, said diaphragms being independently displaceable in the same direction for applying said brake and the other of said diaphragms being operatively connected to brake actuating means, locking means responsive to a brake application resulting from introduction of auxiliary fluid pressure into said auxiliary fluid pressure chamber for preventing return movement of said diaphragms toward brake releasing position, operator controlled valve means in said system for selectively applying service fluid pressure to said service fluid pressure chamber for normal service actuation of said brakes, and a separate operator controlled means for controlling the application of fluid pressure to said auxiliary fluid pressure chamber, means operable when fluid pressure has been introduced into said auxiliary fluid pressure chamber for extracting and controllably accumulating some of said fluid under pressure in a release chamber within said housing, and means effective when said auxiliary fluid pressure in the auxiliary chamber has been reduced for automatically releasing said locking means by the action of said fluid pressure in the release chamber.

11. In the system defined in claim 10, said locking means including a piston within the housing exposed at one side to the pressure in said auxiliary chamber, and said means for extracting said fluid pressure from the auxiliary chamber comprising a bleed passage through said piston to said release chamber which is located at the opposite side of said piston.

12. In the system defined in claim 10, said valve means comprising an inlet port connected to said auxiliary reservoir and an outlet port connected to said auxiliary fluid pressure chamber, an element within said valve means movable between a first position wherein the valve means blocks introduction of fluid under pressure through said inlet port and connects said auxiliary fluid pressure chamber to atmosphere through said outlet port, and a second position where the valve means connects said auxiliary reservoir to said auxiliary fluid pressure chamber.

13. In the system defined in claim 12, spring means biasing said valve element toward said second position, said spring means being compressed when said auxiliary reservoir pressure exceeds a predetermined value with the valve element in said first position, and said spring means being operable to displace said valve element toward said second position when the auxiliary pressure drops below said predetermined value.

14. In a fluid pressure responsive vehicle brake system having a service reservoir containing fluid under pressure and an auxiliary reservoir containing fluid under pressure, an actuator assembly comprising a housing, two separate fluid pressure responsive members disposed in tandem within said housing and defining a service fluid pressure chamber between them and an auxiliary fluid pressure chamber between one of them and the housing, said members being independently displaceable in the same direction for applying said brake and the other of said members being operatively connected to brake actuating means, locking means responsive to a brake application resulting from introduction of auxiliary fluid pressure into said auxiliary fluid pressure chamber for preventing return movement of said members toward brake releasing position, operator controlled valve means in said system for selectively applying service fluid pressure to said service fluid pressure chamber for normal service actuation of said brakes, and a separate operator controlled means for controlling the application of fluid pressure to said auxiliary fluid pressure chamber, means operable when fluid pressure has been introduced into said auxiliary fluid pressure chamber for extracting and controllably accumulating some of said fluid under pressure in a release chamber within said housing, and means effective when said auxiliary fluid pressure in the auxiliary chamber has been reduced by said separate operator control means for automatically releasing said locking means by the action of said fluid pressure in the release chamber.

15. In the system defined in claim 14, said locking means including a piston within the housing exposed at one side to the pressure in said auxiliary chamber, and said means for extracting fluid pressure from the auxiliary chamber comprising a restrictive passage through the piston to said release chamber which is located at the opposite side of said piston.

References Cited

UNITED STATES PATENTS

| 3,011,832 | 12/1961 | Euga | 303—9 XR |
| 3,151,525 | 10/1964 | Dobrikin et al. | 92—24 |
| 3,223,458 | 12/1965 | Valentine | 305—54 XR |

MILTON BUCHLER, *Primary Examiner.*

J. J. McLAUGHLIN, *Assistant Examiner.*

UNITED STATES PATENT OFFICE
CERTIFICATE OF CORRECTION

Patent No. 3,410,610                                        November 12, 1968

James C. Cumming

It is certified that error appears in the above identified patent and that said Letters Patent are hereby corrected as shown below:

Column 8, line 36, "adapted to be connected for auxil-" should read -- connected for normal operation of --.

Signed and sealed this 10th day of March 1970.

(SEAL)
Attest:

Edward M. Fletcher, Jr.                          WILLIAM E. SCHUYLER, JR.
Attesting Officer                                         Commissioner of Patents